Jan. 10, 1956 W. W. SLOANE 2,730,182
CONTROL DIFFERENTIAL TRANSMISSION GEARING
Filed Nov. 21, 1952 2 Sheets-Sheet 1

INVENTOR.
WILLIAM W. SLOANE
BY
Murray A. Gleason
ATTORNEY

Jan. 10, 1956     W. W. SLOANE     2,730,182
CONTROL DIFFERENTIAL TRANSMISSION GEARING
Filed Nov. 21, 1952     2 Sheets-Sheet 2
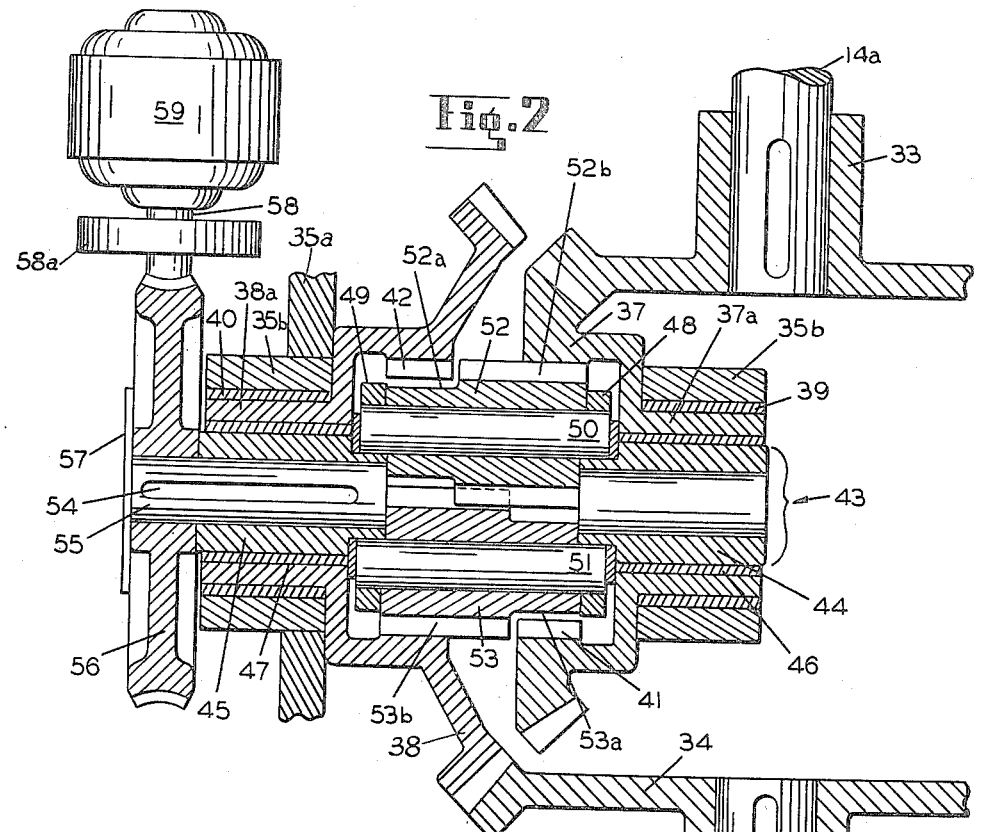
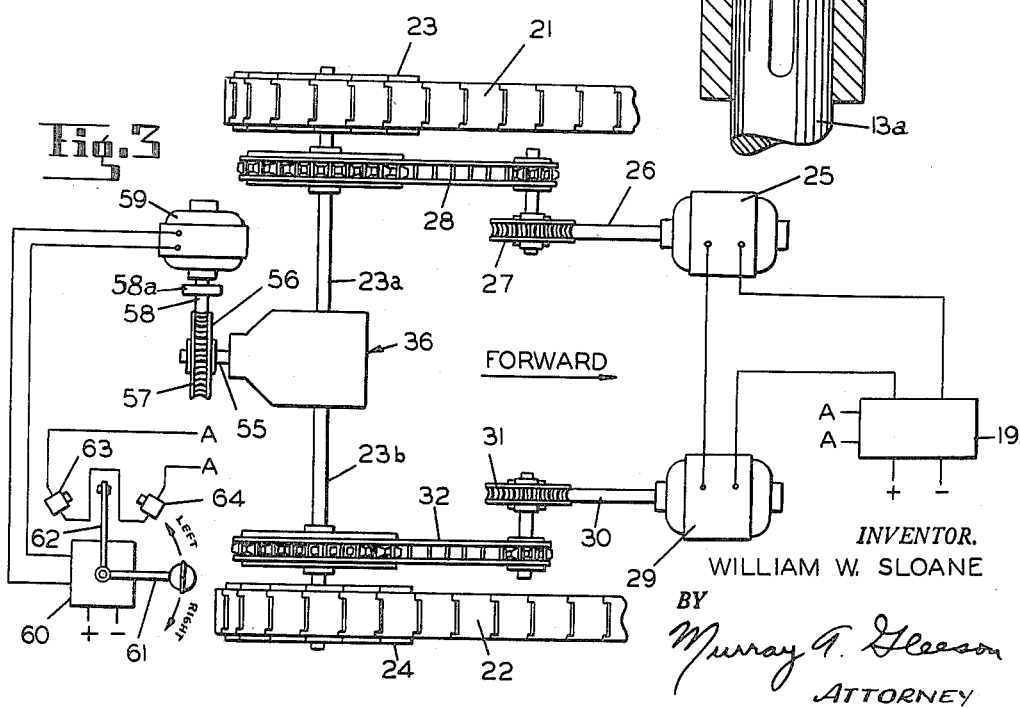
INVENTOR.
WILLIAM W. SLOANE
BY
Murray A. Gleeson
ATTORNEY

United States Patent Office 2,730,182
Patented Jan. 10, 1956

2,730,182

CONTROL DIFFERENTIAL TRANSMISSION GEARING

William W. Sloane, Chicago, Ill., assignor to Goodman Manufacturing Company, Chicago, Ill., a corporation of Illinois Application November 21, 1952, Serial No. 321,928

3 Claims. (Cl. 180—6.44)

This invention relates to improvements in controlled differential transmission gearing especially adapted for steering endless tread vehicles by controlling the relative speeds of the tracks at the opposite sides of the vehicle.

Endless tread vehicles, such as power shovels, mine loaders, or mine shuttle cars, having two laterally spaced endless treads or tracks, are usually steered by increasing or decreasing the speed of one track relative to the other so as to result in the turning of the vehicle in the direction of the slower moving track. The two treads are sometimes driven from a single motor through conventional differential gearing, and independent brakes are provided to control the speed of each tread. In another steering arrangement, the two treads each have individual drive motors with independent brakes for the two drive connections.

One of the shortcomings of steering arrangements including dual brakes, as above described, is that they do not insure a positive power and speed relation between the two tracks at all times, as for instance where the machine is traveling over ground having alternate slippery and firm spots. Under such conditions, the machine tends to weave one way or the other, requiring constant correction, both for traveling in a straight line and for turning. Indeed, turning under such slippery conditions often results in a series of sidewise jerks.

The principal object of the present invention is to provide a steering control especially adapted for endless tread vehicles permitting the same to be trammed stably in a straight line, or turned smoothly on a selected radius, with a positive control over the speed differential between the two tracks under all traction conditions.

In carrying out my invention, I provide a controlled differential gear mechanism for positively varying the application of power from a main source of power to a pair of members driven by reversible treads, which differential mechanism is operated by a motor controlled independently of the main power drive means for the two treads, to effect turning of the vehicle either in one direction or another, or cause it to travel in a straight line when the reversible steering motor is stationary. When the independent steering motor is actuated in one direction or the other, the relative speed of the endless treads is varied to change the turning radius of the vehicle, dependent on the speed of the steering motor. The turning radius is thus shortened as the steering motor speed is increased. Furthermore, the steering motor can under certain conditions be used for completely reversing the direction of drive of the two tracks with respect to each other, so as to impart a maximum turning or spinning movement to the vehicle on its own axis.

The invention may best be understood by reference to the accompanying drawings, in which:

Figure 2 is an enlarged cross-sectional view of the controlled differential gearing employed with the drive connections shown in Figure 1;

Figure 3 is a schematic diagram of another embodiment of my invention, as applied to a 2-motor main drive for the endless tracks.

Figure 1:
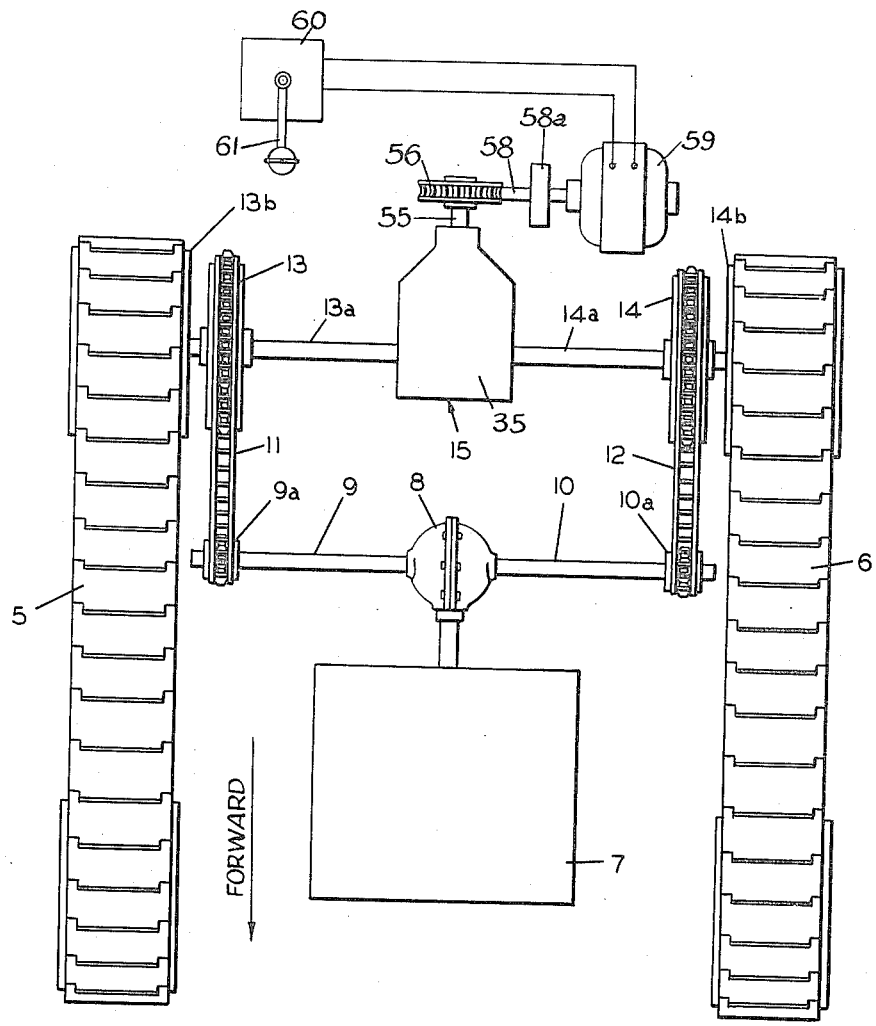
Figure 1 is a schematic diagram of one embodiment of my invention as applied to an endless tread vehicle, in which the two tracks are driven from a single motor through a conventional differential gear.

Referring to details of the embodiment of my invention illustrated more or less diagrammatically in Figures 1 and 2 of the drawings, the laterally spaced endless tracks or crawlers 5 and 6 of a track-laying vehicle are driven from motor 7 through a conventional differential gear mechanism 8 which drives shafts 9 and 10 having chain sprockets 9a and 10a, respectively. Said sprockets are connected by chains 11 and 12 to sprockets 13 and 14 on shafts 13a and 14a. The latter shafts also carry sprockets 13b and 14b which engage the ends of tracks 5 and 6, respectively.

The shafts 13a and 14a are coaxially mounted at opposite sides of a gear mechanism, indicated generally at 15. Said shafts carry bevel pinions 33 and 34 within the housing 35 of said gear mechanism. Bevel gears 37 and 38, axially aligned on a longitudinal axis, are mounted within said housing in mesh, respectively, with pinions 33 and 34. In the form shown herein, one set of meshing bevel gears 33 and 37 have smaller pitch diameters than the other set of bevel gears 34 and 38, but the two sets have the same gear ratios.

Gears 37 and 38 have hollow hubs 37a and 38a respectively, journalled in bearings 39 and 40 supported in bearing supports 35a and 35b within housing 35. The two bevel gears 37 and 38 are formed with opposed internal ring gears 41 and 42, respectively, of the same pitch diameters.

A spider or cage generally designated 43 includes a pair of sleeve sections 44 and 45, respectively, extending through bearing sleeves 46 and 47 in the hollow gear hubs 37a and 38a, and having longitudinally spaced flanges 48 and 49 between which are mounted a pair of shafts 50 and 51 in equidistant parallel relation to the axis of rotation of the cage 43. Rotatably mounted on the last-named shafts are a pair of spur gears 52 and 53 which have reduced hub portions 52a and 53a, and larger toothed portions 52b and 53b, respectively, disposed in reversed end-to-end relation to each other. The toothed portions 52b and 53b are meshed, respectively, with the internal ring gears 41 and 42, and are also meshed with each other where their gear teeth overlap at the center of the cage.

It may be observed at this point that my novel gear arrangement with the "planetary" type gears 52 and 53 is similar in some respects to a conventional planetary gear mechanism, yet it lacks the usual sun gear. Instead, the gears 52 and 53 are meshed with each. However, the gearing arrangement of the present invention can aptly be termed a controlled differential gear mechanism, because the two shafts 13a and 14a are driven at positively controlled, mutually varying speeds, as will presently appear.

The sleeve 45 is keyed at 54 on a shaft 55 passing through the end of housing 35 and having a driving worm wheel 56 fixed on its outer end. The worm wheel is driven by a worm 57 carried on shaft 58 which, in turn, is driven by a steering motor 59. The steering motor shown herein is a reversible electric motor, preferably shunt wound, supplied with current from a suitable source of power and controlled independently of the drive motor 7 by a controller 60 which may be of any conventional form having a control handle 61 capable of controlling the direction and speed of motor 59. A hydraulic motor could be used in place of the electric motor if desired.

The use and operation of my invention is as follows:

When it is desired to tram the vehicle straight forward or backward, the main drive motor 7 will be actuated, but the steering motor 59 will be inactive so that the cage 43 will remain stationary.

Under many conditions, normal friction in the drive connections from the steering motor may be sufficient to assure non-rotation of the cage 43 when the steering motor 59 is not energized, but positive means may be provided if desired, to hold the cage 43 stationary for steering in a straight line. For instance, the worm gear 56 and worm 57 may be of the self-locking type, or a conventional friction brake, indicated generally at 58a, may be mounted on shaft 58 of the steering motor.

As seen in Figure 2, pinion 33 and its shaft 14a will tend to be driven by the main drive motor 7 in the same direction as pinion 34 and its shaft 13a. Gears 37 and 38 will then be driven in opposite directions, causing corresponding idling rotation of the gears 52 and 53 on shafts 50 and 51, which are stationary with cage 43. Since the gears 52 and 53 are also meshed with each other, the two shafts 13a and 14a will be mechanically interlocked so as to insure rotation of said shafts in the same direction and at the same speed. This condition will continue as long as cage 43 remains stationary, with the result that neither of the tracks 5, 6 can run ahead of the other regardless of any variations in ground traction under the two tracks.

To steer toward one side to the sharpness of any turn desired, the controller handle 61 is moved a corresponding amount and in the proper direction to actuate the steering motor 59 and rotate the cage 43 at the desired speed in the desired direction. This will cause one of the shafts 13a or 14a to slow down, while causing the other shaft to speed up by exactly the same amount. The usual action of the conventional differential gearing 8 permits this variation in speed of the two shafts. The sharpness of curve in the same direction can be increased or decreased as desired, by increasing or decreasing the speed of motor 59 in the same direction. With a steering motor providing sufficient speed and power, it is possible not only to bring one of the tracks to a standstill while transmitting all the power from the main drive motor 7 through differential gear 8 to the opposite track, but also to reverse the direction of travel of one track relative to the other.

It is further possible to shut off the power of the main drive motor 7, whereupon the two tracks can be driven at equal speeds in opposite directions by the steering motor alone, so that the vehicle will be swung or rotated bodily on a stationary axis, when maximum turning movement is desired.

The modified drive and electric control arrangement shown in Figure 3 includes a pair of crawler tracks 21 and 22 driven by sprockets 23 and 24, respectively. Sprocket 23 is driven by an electric motor 25 through shaft 26, worm and wheel 27, and sprocket and chain drive 28. Similarly, sprocket 24 is driven by motor 29 through shaft 30, worm and wheel 31, and sprocket and chain drive 32. Motors 25 and 29 are substantially identical motors, preferably series wound and connected in series with each other to a suitable source of power, and controlled by a controller indicated at 19.

The track sprockets 23 and 24 correspond to the sprockets 13b and 14b of the form shown in Figure 1, while the shafts 23a and 23b and gear housing 36 correspond, respectively, to shafts 13a and 14a and gear housing 35 of Figure 1. The form of Figure 3 also has a steering motor 59 with a controller 60 and a control handle 61 shown in neutral position. The control handle 61 also has an arm 62 associated with it for actuating switches 63 and 64 automatically for extremely sharp turns at the extreme limit of movement of control handle 61. The switches 63 and 64 are connected, through lines A, A, with the main motor control 19 as shown in Figure 3, so as to open the circuit to motors 25, 29 when either switch 63 or 64 is actuated. Accordingly, at the extreme limit of movement of control handle 61 in either direction, power from the main drive motors will be automatically cut off, and turning movement will be effected solely by power from the steering motor, with the two tracks driven in opposite directions to swing the vehicle bodily on a stationary axis.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. A variable speed control for a pair of power driven shafts, comprising concentric gears operatively connected with said shafts and normally rotatable by said shafts in opposite directions, a cage rotatably mounted concentric with said gears, a pair of idler gears carried by said cage on parallel axes spaced from the common axis of said cage and said first-named gears, said idler gears having teeth meshed with said first-named gears and also teeth meshed with each other on substantially uniform pitch diameters, and independently driven power-operated control means for rotating said cage reversely for controlling the relative speed of rotation of said power-driven shafts.

2. In a track laying vehicle having two laterally spaced endless tracks with a power-operated gearing connected to each of the tracks for driving the latter normally at the same speed in the same direction, the improvement comprising a variable speed control for the endless tracks, said speed control having concentric gears operatively connected with said tracks and normally rotatable by by said shafts in opposite directions, a cage rotatably mounted concentric with said gears, a pair of idler gears carried by said cage on parallel axes spaced from the common axis of said cage and said first-named gears, said idler gears having teeth meshed with said first-named gears and also teeth meshed with each other on substantially uniform pitch diameters, and independent power-operated control means for rotating said cage in either direction of rotation at varying selected rotational speeds so as to control the relative speed of the endless tracks.

3. In a track laying vehicle having two laterally spaced endless tracks, and two series-wound electric motors connected for series energization through a single controller, and having individual mechanical driving connections with each of said tracks, the improvement which consists in providing a variable speed control for said tracks including concentric gears operatively connected with each of said tracks and normally rotatable by said shafts in opposite directions, a cage rotatably mounted concentric with said gears, a pair of idler gears carried by said cage on parallel axes spaced from the comman axis of said cage and said first-named gears, said idler gears being meshed respectively with said first-named gears and with each other, a speed control motor independent of the series-wound motors for rotating said cage in either direction at varying selecting rotational speeds so as to vary the relative speed of the endless tracks, a separate controller for the control motor having manual control means for effecting reversal of said control motor at varying speeds, and switch means responsive to movement of said manual control means into two predetermined motor reversing positions thereof for shutting off the power supply to the series-wound motors, from the series-wound motor controller.

References Cited in the file of this patent

UNITED STATES PATENTS

| | | |
|---|---|---|
| 1,130,054 | Barnum | Mar. 2, 1915 |
| 1,406,627 | Elbertz | Feb. 14, 1922 |
| 1,437,715 | Bridge | Dec. 5, 1922 |
| 1,483,959 | Welch | Feb. 19, 1924 |
| 1,931,071 | Halstead | Oct. 17, 1933 |
| 1,991,094 | Higley | Feb. 12, 1935 |
| 2,027,218 | Armington | Jan. 7, 1936 |
| 2,393,557 | Orshansky | Jan. 22, 1946 |
| 2,605,852 | Rhoads | Aug. 5, 1952 |

FOREIGN PATENTS

| | | |
|---|---|---|
| 364,767 | France | June 9, 1906 |